(12) United States Patent
Toussaint et al.

(10) Patent No.: US 9,972,874 B2
(45) Date of Patent: May 15, 2018

(54) BATTERY WITH EXTRACTIBLE AIR ELECTRODE

(71) Applicant: ELECTRICITE DE FRANCE, Paris (FR)

(72) Inventors: Gwenaelle Toussaint, Nemours (FR); Philippe Stevens, Noisy Rudignon (FR); Sophie Deshayes, Rampillon (FR)

(73) Assignee: Electricite de France, Paris (FR)

( * ) Notice: Subject to any disclaimer, the term of this patent is extended or adjusted under 35 U.S.C. 154(b) by 16 days.

(21) Appl. No.: 15/038,101

(22) PCT Filed: Nov. 21, 2014

(86) PCT No.: PCT/FR2014/053002
§ 371 (c)(1),
(2) Date: May 20, 2016

(87) PCT Pub. No.: WO2015/075401
PCT Pub. Date: May 28, 2015

(65) Prior Publication Data
US 2016/0294027 A1 Oct. 6, 2016

(30) Foreign Application Priority Data

Nov. 22, 2013 (FR) ..................................... 13 61516

(51) Int. Cl.
*H01M 12/02* (2006.01)
*H01M 12/06* (2006.01)
(Continued)

(52) U.S. Cl.
CPC ............. *H01M 12/02* (2013.01); *H01M 4/86* (2013.01); *H01M 12/065* (2013.01); *H01M 12/08* (2013.01)

(58) Field of Classification Search
CPC ........ H01M 12/02; H01M 4/86; H01M 12/08; H01M 12/065
See application file for complete search history.

(56) References Cited

U.S. PATENT DOCUMENTS 5,190,833 A * 3/1993 Goldstein ............... H01M 4/86
429/210
5,306,579 A 4/1994 Shepard, Jr. et al.
(Continued)

FOREIGN PATENT DOCUMENTS

EP 0 952 622 A1 10/1999
JP 2013-506950 A 2/2013
(Continued)

OTHER PUBLICATIONS

Neburchilov et al., "A review on air cathodes for zinc-air fuel cells," Journal of Power Sources, 2010, vol. 195, pp. 1271-1291.
(Continued)

*Primary Examiner* — Stewart A Fraser
(74) *Attorney, Agent, or Firm* — Drinker Biddle & Reath LLP (57) ABSTRACT

A rechargeable battery including a casing containing therein: an air electrode; a negative electrode; and an electrolyte, in which the air electrode can be taken out of the casing. The rechargeable battery also relates to a cathode compartment for an air electrode battery, where the compartment includes an air electrode and is insertable into a casing of the battery without being part of the casing, and the compartment is removably movable.

13 Claims, 5 Drawing Sheets (51) Int. Cl.
*H01M 4/86* (2006.01)
*H01M 12/08* (2006.01)

(56) References Cited

U.S. PATENT DOCUMENTS

| | | | |
|---|---|---|---|
| 5,418,080 A | | 5/1995 | Korail et al. |
| 6,355,369 B1* | | 3/2002 | Iarochenko ............. H01M 4/46 |
| | | | 429/110 |
| 2010/0255375 A1 | | 10/2010 | Jiang et al. |
| 2012/0183880 A1 | | 7/2012 | Toussaint et al. |
| 2014/0220459 A1* | | 8/2014 | Iida .................... H01M 4/9083 |
| | | | 429/405 |
| 2015/0024288 A1* | | 1/2015 | Nagayama ............ H01M 2/362 |
| | | | 429/403 |
| 2015/0050569 A1* | | 2/2015 | Tsukada ................ H01M 12/06 |
| | | | 429/405 |

FOREIGN PATENT DOCUMENTS

| | | | |
|---|---|---|---|
| JP | 2013-225443 A | 10/2013 | |
| KR | 10-2013-0055635 A | 5/2013 | |
| WO | 00/36677 A1 | 6/2000 | |
| WO | 2010/128242 A1 | 11/2010 | |
| WO | 2012/156639 A1 | 11/2012 | |

OTHER PUBLICATIONS

Office Action issued in related application JP 2016-533123, dated May 29, 2017, with English language translation, 4 pages.
Office Action issued in related application KR 10-2016-7015832, dated Jun. 12, 2017, with English language translation, 12 pages.

* cited by examiner

BATTERY WITH EXTRACTIBLE AIR ELECTRODE

CROSS-REFERENCE TO RELATED APPLICATIONS

This application is the U.S. national phase of the International Patent Application No. PCT/FR2014/053002 filed Nov. 21, 2014, which claims the benefit of French Application No. 13 61516 filed Nov. 22, 2013, the entire content of which is incorporated herein by reference.

FIELD

The present invention relates to the technical field of batteries comprising an air electrode and more particularly batteries comprising a case and inside the latter an air electrode, a liquid electrolyte and the negative electrode. This negative electrode can be a metal electrode.

BACKGROUND

Metal-air batteries belong to batteries comprising an air electrode and use a metal negative electrode, based for example on zinc, iron or lithium, coupled to the air electrode. During discharge, the following reactions take place:

Thus, oxygen is reduced at the air electrode and the metal of the negative electrode is oxidized. Usually, an aqueous alkaline electrolyte is used.

These metal-air batteries have several applications, for example zinc-air batteries are marketed for use in auditory prostheses.

Numerous studies have been carried out over several decades for the development and optimization of air electrodes making it possible to produce electrochemical generators of the metal-air type, known for their high energy densities and capable of reaching several hundred Wh/kg.

Air electrodes are also used in alkaline fuel cells.

An air electrode makes it possible to use atmospheric air, which is available in unlimited quantity anywhere and at any time, as oxidizing agent for the electrochemical reaction.

An air electrode is a porous solid structure in contact with the liquid electrolyte, which is generally an alkaline solution. The interface between the air electrode and the liquid electrolyte is a so-called "triple contact" interface, in which the active solid material of the electrode, the gaseous oxidizing agent (air) and the liquid electrolyte are present simultaneously.

A description of the different types of air electrodes for zinc-air batteries is disclosed for example in the bibliographical article by V. Neburchilov et al., entitled "A review on air cathodes for zinc-air fuel cells": Journal of Power Sources, 195 (2010), pages 1271 to 1291.

When a metal-air battery is to be electrically charged, the direction of the current is reversed and the following reactions take place:

Thus, oxygen is produced at the positive electrode and the metal is re-deposited by reduction on the negative electrode.

Although these batteries operate without a major problem in the discharge phase, they are not stable in the charging phase; the weak point of the metal-air battery during the charging phase is the air electrode, which is not designed to be used in the reverse direction (i.e. under oxidation).

In fact, the air electrode has a porous structure and operates in the form of a volumetric electrode in which the electrochemical reaction takes place within the volume of the electrode, at the interface between a gas (oxygen from the air), a liquid (the electrolyte) and a solid (the active material of the electrode and optionally a catalyst): this is the triple contact. This porous structure is important because it offers a necessary large reaction surface area, and therefore a high current density, as the density of the gaseous oxygen is low with respect to a liquid. For example, the molar density of the oxygen in air is equal to about 0.03 mol/L while water has a density of 55 mol/L.

Thus, generally, an air electrode is manufactured from carbon granules with a high surface area, such as Vulcan® XC72 marketed by Cabot. The surface area of the carbon can also be further increased by reaction with a gas, such as $CO_2$, before its incorporation into the air electrode. The carbon granules are then agglomerated in order to form the air electrode, using a hydrophobic fluorinated polymer such as a fluorinated ethylene propylene copolymer (FEP) marketed by Dupont. Document WO 2000/036677 describes such an electrode for a metal-air battery.

This large reaction surface area is not necessary for the reverse oxidation reaction at the positive electrode during the charging phase, since the concentration of active material is much higher. On the contrary, the porous structure of the air electrode has the drawback of being fragile: it was found by the inventors that the porous structure of the air electrode was mechanically destroyed by the release of gaseous oxygen when it was used for oxidation of the liquid electrolyte to oxygen. In fact, the hydraulic pressure generated within the air electrode by the production of gaseous oxygen is sufficient to cause breaking of the bonds between the carbon granules constituting the air electrode.

The inventors also noted that the catalyst, which is added to the air electrode in order to improve the energy yield of the oxygen reduction reaction such as manganese or cobalt oxide, is not stable at the potential necessary for the oxygen reduction. Furthermore, corrosion takes place by oxidation of the carbon in the presence of oxygen and is accelerated at high potentials.

In order to overcome this, some authors use a more resistant oxygen reduction catalyst coupled with an oxygen release catalyst in the bifunctional electrodes composed of two electrically-coupled layers (see for example patent U.S. Pat. No. 5,306,579). Unfortunately, these bifunctional electrodes have a short lifetime and a limited number of cycles because the structure of these electrodes does not withstand the release of gas produced over long periods of time and because the catalyst is not stable and the carbon corrodes at the potentials applied during charging.

These degradations of the air electrode during the charging phase significantly reduce its lifetime and are one of the main reasons that prevent the commercial development of electrically rechargeable metal-air storage cells.

As a result, the lifetime of the air electrode is shorter than that of the metal electrode for batteries/cells used alternately in discharge and charge mode. Now, it would be a waste to have to discard the battery/cell when the metal electrode is still usable.

Generally, the problem associated with the release of gas during charging at the air electrode is found for any battery comprising an air electrode.

SUMMARY

Thus, one of the objectives of the present invention is to overcome at least one drawback of the state of the art described above.

To this end, the present invention proposes a cathode compartment for a battery with an air electrode, comprising an air electrode and suitable for extractible insertion into a battery case. The air electrode is in the form of a plate and the cathode compartment is liquid-tight. The cathode compartment also comprises an electrical connection for connecting the air electrode to a positive terminal of a battery, and a hollow cartridge having an air inlet and an air outlet, with at least one flat face formed at least partially by the air electrode.

Thus, the air electrode is comprised within an extractible cathode compartment. It is thus possible to continue to use the negative electrode, in particular the metal electrode of a metal-air battery, in a simple manner when the air electrode is at the end of its life. In fact, there is no need to dismantle the battery/cell assembly in order to replace the air electrode.

Other optional and non-limitative characteristics of the cathode compartment are as follows.

As a variant, the cathode compartment also comprises a rim on its face, formed at least partially by the air electrode of the cartridge, in order to limit the compression of the negative electrode, in particular when the latter is made from metal.

The cathode compartment advantageously also comprises an additional air electrode in the form of a plate at least partially forming another face of the hollow cartridge, the other face being opposite to the face formed at least partially by the air electrode.

The cathode compartment advantageously comprises a honeycombed mechanical reinforcement arranged inside the cartridge, abutting the air electrode.

The cathode compartment can have a lower part and an upper part, the lower part comprising the air electrode(s) and the upper part having at least one section below the section of the lower part.

The invention also proposes a rechargeable battery comprising a case and inside the latter:
an air electrode;
a negative electrode; and
an electrolyte; and
in which the air electrode can be extracted from the case and inserted into a compartment as described above.

Thus, it is easy to replace the air electrode when it reaches the end of its life.

Other optional and non-limitative characteristics of the battery are as follows.

In the case in which the negative electrode is a metal electrode, the electrolyte is a liquid electrolyte; the cathode compartment is moveable within the case. The battery then comprises an electrically insulating separator between the air electrode and the metal electrode and a flexible element. The separator, the cathode compartment and the metal electrode are arranged so that the flexible element acts on the cathode compartment so that the latter compresses the metal electrode via its face formed at least partially by the air electrode. This flexible element can be the battery case or a compression system arranged against one wall of the case.

Advantageously, the battery comprises a second air electrode incorporated into a second extractible moveable cathode compartment as described above, and a second electrically insulating separator between the second air electrode and the metal electrode. The two cathode compartments and the metal electrode are arranged so that the metal electrode is compressed between the two cathode compartments via their faces formed at least partially by the air electrodes.

The battery can also comprise a second positive electrode for charging the battery. In this case, the second positive electrode is advantageously arranged between the cathode compartment and the negative electrode. The battery then also comprises at least one spacer placed in contact with the second positive electrode in order to facilitate the removal of the oxygen bubbles produced on the second positive electrode during charging. As a variant, two spacers can be arranged one on each side of the positive electrode. Thus, the spacer can be provided against a face of the second positive electrode turned towards the negative electrode, respectively towards the air electrode. In this case, the battery also comprises at least one mechanical protection arranged between the spacer and the negative electrode, respectively the air electrode, in order to protect them against the spacer.

BRIEF DESCRIPTION OF THE DRAWINGS

Other objectives, characteristics and advantages will become apparent in the light of the following description, with reference to the drawings given by way of illustration and non-limitatively, in which.

DETAILED DESCRIPTION

A battery with an air electrode according to the invention is described hereinafter with reference to FIGS. 1 to 12. Generally, the term "battery" is used herein to denote any electrical element making it possible to store energy in chemical form and to restore it in electrical form. Thus, this term covers equally the terms "cell", "fuel cell", "regenerative fuel cell" and "storage cell".

Such a battery 1 comprises a case 11 and, inside the latter, an extractible air electrode 22, a negative electrode 3 and an electrolyte 4.

The air electrode 22 can thus be removed from the case 11, for example by sliding, so that it can be replaced when it reaches the end of its life or deteriorates, due, for example, to the fact that the structure of the agglomerated granules of carbon is too damaged. The air electrode 22 can also be moveable inside the case 11, in particular in order to allow the compression of the negative electrode 3 as will be described in greater detail hereinafter.

The air electrode 22 is preferably made from a porous material that conducts electrons. This porous material is for example a compound of carbon black, a cobalt or manganese oxide-based catalyst, a hydrophobic binder such as HFP (hexafluoropropylene) or PTFE (polytetrafluoroethylene), and a current collector such as a collector in the form of a nickel grid. An anion-conducting polymer can be added to the electrode as described in the patent WO 2010/128242 A1, in particular when the electrolyte is aqueous. This polymer has the function of preventing the carbonation of the aqueous electrolyte by the $CO_2$ contained in the air. The hydrophobic binder has the double function of producing a mechanically integrated porous structure from a powder the electron percolation of which is ensured by contact between the carbon granules, and of being sufficiently hydrophobic to prevent the electrolyte from passing through the electrode when the electrolyte is a liquid.

The negative electrode 3 can be a metal electrode as in the case of a metal-air battery. The material of the metal electrode is preferably zinc, iron or lithium. In this case, the electrolyte is a liquid electrolyte.

The battery 1 can also comprise a cathode compartment 2 comprising a hollow cartridge 21 and an electrical connection 23 for connecting the air electrode 22 to the positive terminal of the battery 1 (see FIGS. 1 to 4). The cathode compartment 2 is suitable for extractable insertion into the case 11 of the battery. The cathode compartment 2 is preferably liquid-tight, for example to the liquid electrolyte 4 of the battery 1, in particular when the cathode compartment 2 is intended to compress the negative electrode 3 as will be described below.

The cartridge 21 thus has a cavity in which air may circulate. The cartridge 21 also has an air inlet 24 and an air outlet 25 for the circulation of air within the cartridge 21 and contact with the air electrode 22. The air used to supply the cartridge 21 can be untreated, or treated in order to be for example humidified, dried, decarbonated (removal of the $CO_2$) or enriched with oxygen.

The air electrode 22 is incorporated into the cathode compartment 2 in a sealed manner in the form of a plate forming at least partially one of the faces of the cartridge 21. The cartridge 21 can then have a cylindrical shape with at least one flat face formed at least partially by the air electrode 22. In this case the cartridge 21 can be extractible by sliding, perpendicularly to the apothem of the cylinder.

Thus, replacement of the extractible air electrode 22 can be carried out easily by simply removing the cathode compartment 2.

As a variant, an additional air electrode 27 can be provided in the cathode compartment 2. This additional second air electrode 27 forms at least partially a second face of the cassette 21 opposite to the face formed at least partially by the first air electrode 22 (see FIG. 3). In this case, the cartridge 21 preferably has a cylindrical shape with two parallel flat faces.

The cathode compartment 2 can also comprise a honeycombed mechanical reinforcement 26 inside the cartridge 21 in order to reinforce it. This mechanical reinforcement 26 abuts the air electrode 22.

This mechanical reinforcement 26 is particularly advantageous when the negative electrode 3 is a metal electrode in the form of a plate and the cathode compartment 2 and the metal electrode 3 are arranged so that the cathode compartment 2 compresses the metal electrode 3 via its face formed at least partially by the air electrode 22, for example against a wall of the case 11, preventing the deformation of the air electrode 22 when the metal electrode 3 is compressed.

In such an embodiment, the battery 1 comprises a separator 5 electrically insulating the air electrode 22 from the metal electrode 3 and arranged between them. The separator 5 is an element made from a material that is electrically insulating and ion conducting, for example a polyelectrolyte, i.e. a polymer comprising charged groups. As a variant, it can also be made from an electrically insulating material that is permeable to the liquid electrolyte, for example a felt. Provision can be made for the separator 5 to be attached to the air electrode 22 and/or to the negative electrode 3. Furthermore, the battery 1 comprises a flexible element acting on the cathode compartment 2 in order to hold it against the negative electrode 3 via the separator 5.

Compressing the metal electrode 3 is advantageous for the following reasons. During the charging phase of the metal-air battery, the metal ion is reduced to metal at the negative electrode which is deposited there when the potential at this negative electrode allows. Now, under certain conditions, the metal is deposited in the form of a foam that is poorly adherent to the surface of the metal electrode. This poorly adherent foam may detach from the electrode, causing a loss of active material and consequently a reduction in the capacity of the battery. The inventors noted that compressing the metal electrode during the charging phase limited the formation of this poorly adherent foam. Furthermore, this compression also prevents the metal electrode from deforming during repeated charge and discharge cycles by ensuring a uniform, homogeneous and dense distribution of the deposition of metal on the metal electrode.

The flexible element can be formed by the case 11 of the battery. The elements that are placed inside the case 11 are inserted therein by force. The flexible element can also be produced in the form of a compression system 6. This compression system 6 is arranged against a wall of the case 11 and another element of the battery 1, for example the cathode compartment 2 or the metal electrode 3. The compression system 6 makes it possible to ensure the compression of the metal electrode 3 once the cathode compartment 2 and the metal electrode 3 are in place and after their insertion. The compression system 6 is advantageously produced from a flexible material, for example a flexible foam. An example of flexible foam would be for example a polychloroprene foam (also called Neoprene®), preferably the neoprene foams marketed under the name Bulatex®, in particular Bulatex C166, by the Hutchinson company. Another example of such a foam would be the product Sylomer® G, a polyurethane foam marketed by the Plastiform company. The foam is preferably a closed-porosity foam and isolated from the liquid electrolyte. It is therefore preferably placed in a flexible, liquid-tight pouch and stable in contact with the liquid electrolyte. For example a heat-sealable extruded polyethylene pouch.

Provision can be made for the compression system 6 to be extractible, thus making it possible after its withdrawal to remove the cathode compartment(s) 2 more easily.

The battery 1 can comprise two cathode compartments 2 as described above. In the case of a battery 1 comprising a metal electrode as negative electrode 3, the metal electrode 3 in the form of a plate can be compressed between the faces formed at least partially by an air electrode 22 of the cathode compartments 2. Separators 5 electrically insulate the metal electrode 3 from the air electrodes 22.

As yet another variant, the cathode compartment 2 can comprise two air electrodes 22, 27 as described above, and the battery 1, two negative electrodes 3 in the form of a plate arranged one on either side of the cathode compartment 2 and optionally, in the case of a metal electrode, each against a face formed at least partially by an air electrode 22, 27. In the latter case, the cathode compartment 2 can at the same time compress both of the metal electrodes 3 in the same way as described above.

The cartridge 21 of the cathode compartment 2 can comprise, advantageously when the negative electrode 3 is a metal electrode, a rim 28 on its face formed at least partially by the air electrode 22, in order to limit the compression of the metal electrode 3.

In the case in which the metal electrode 3 is compressed between the cathode compartment 2 and a wall of the case 11, the cathode compartment 2 compresses the metal electrode 3 in the direction of the wall of the case 11 until the rim 28 comes into contact with the latter.

In the case in which the metal electrode 3 is compressed between two cathode compartments 2, either a single one of the two compartments 2 has a rim 28, or both of the compartments 2 have a rim 28. In the first case, the rim 28 will come into contact with the face of the cartridge 21 of the other cathode compartment 2 without a rim, as mentioned above for the rim 28 and the wall of the case. In the second case, the rims 28 are provided on the faces of the cartridges 21 so as to face each other, in such a way that the two cathode compartments 2 compress the metal electrode 3 until the two rims 28 come into contact with each other.

In the case in which the cathode compartment 2 comprises two air electrodes 22 at least partially forming opposite faces of the cartridge 21, it may comprise a rim 28 on one of the faces but not the other, or a rim 28 on each of the faces. The rim(s) act(s) in the same way as described above.

The cathode compartment 2 can comprise a lower part $2_{INF}$ and an upper part $2_{SUP}$, the lower part $2_{INF}$ comprising the air electrode(s) 22. The upper part $2_{SUP}$ has at least one section perpendicular to the plane of the air electrode below that of the lower part $2_{INF}$. Thus, at the upper part $2_{SUP}$ of the cathode compartment 2, a more extensive space is provided in the case 11 of the battery 1 in order to collect the liquid electrolyte 4. This allows at the same time a more compact format for the battery 1. Equally, the additional volume created by the difference in cross section of the upper $2_{SUP}$ and lower $2_{INF}$ parts of the cathode compartment 2 makes it possible to avoid the electrolyte 4 rising too high and spilling over during the charging phase because the release of gaseous oxygen produces bubbles inside the battery, which raises the level of the electrolyte.

For example, the lower part $2_{INF}$ has a rectangular shape and the upper part $2_{SUP}$ a trapezoidal shape, in other words, the edges of the upper part are were cut on the bias, so that the cross section of the upper part $2_{SUP}$ reduces as the distance from the lower part $2_{INF}$ increases. The cross section of the upper part $2_{SUP}$ can then remain constant (see FIG. 11).

Figure 12:
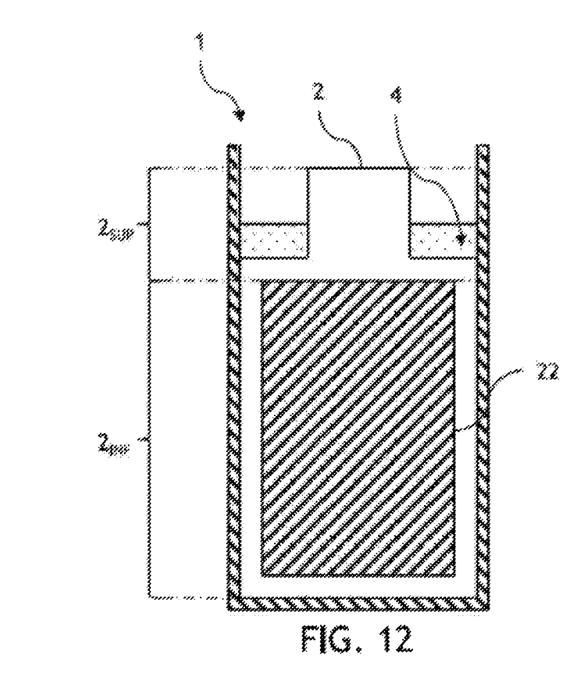
FIG. 12 shows diagrammatically a battery according to the present invention in which the cathode compartment has an upper part and a lower part, both of which are rectangular, the cross section of the upper part being less than the cross section of the lower part, thus forming a shoulder at the interface between them.

In another example, the lower part $2_{INF}$ and the upper part $2_{SUP}$ have a rectangular shape forming a shoulder at the interface between the two parts $2_{INF}$, $2_{SUP}$ (see FIG. 12).

Figure 1:
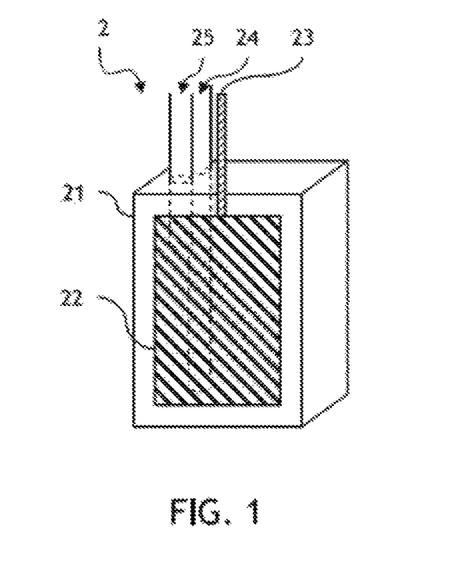
FIG. 1 shows diagrammatically a cathode compartment used in a battery according to the present invention.
Figure 2:
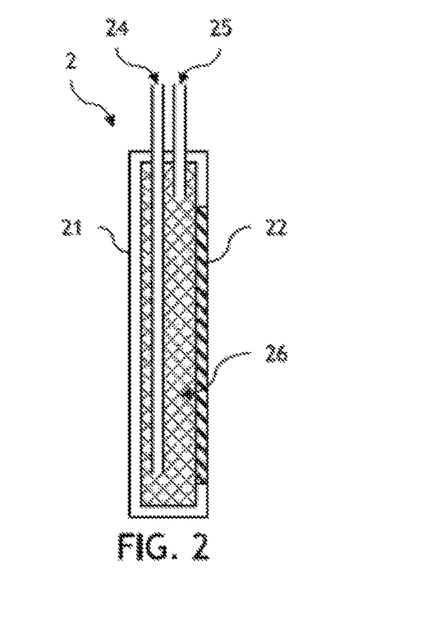
FIG. 2 shows diagrammatically in cross section the cathode compartment in FIG. 1 comprising an air electrode and a honeycombed mechanical reinforcement.
Figure 3:
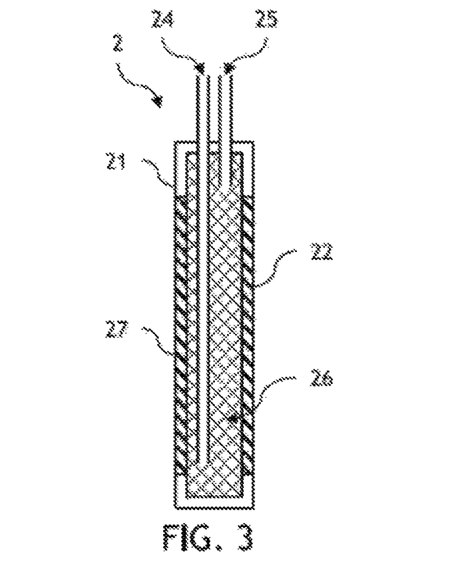
FIG. 3 shows diagrammatically in cross section the cathode compartment in FIG. 1 comprising two air electrodes and a honeycombed mechanical reinforcement.
Figure 4:
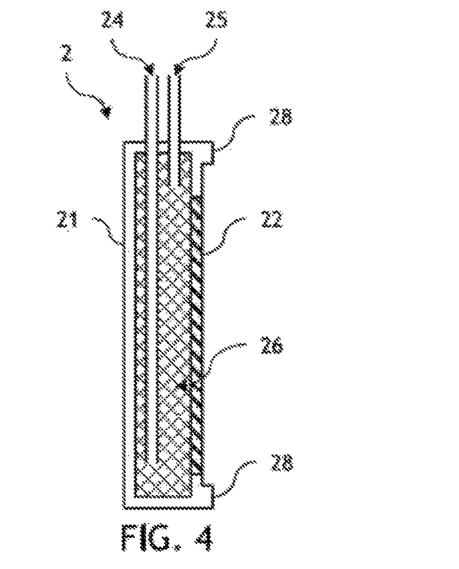
FIG. 4 shows diagrammatically in cross section the cathode compartment in FIG. 1 comprising an air electrode, a honeycombed mechanical reinforcement, and the cartridge of which has a rim.
Figure 5:
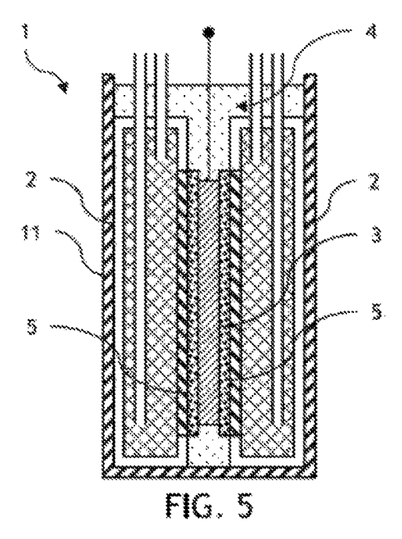
FIG. 5 shows diagrammatically an embodiment of a battery according to the present invention comprising a case, a metal electrode, two cathode compartments from FIG. 2 and two separators.
Figure 6:
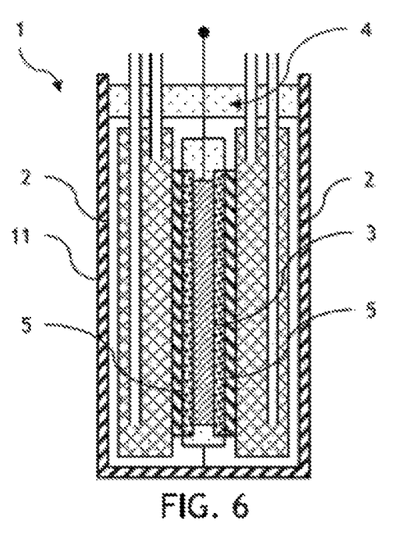
FIG. 6 shows diagrammatically an embodiment of a battery according to the present invention comprising a case, a metal electrode, two cathode compartments from FIG. 4 and two separators.
Figure 7:
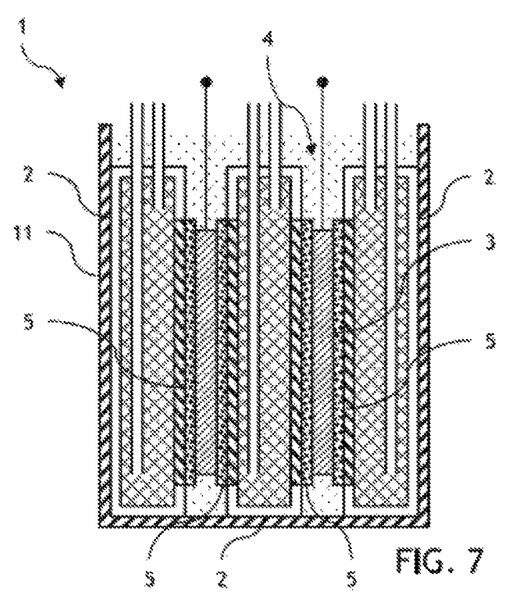
FIG. 7 shows diagrammatically an embodiment of a battery according to the present invention comprising a case, two metal electrodes, two cathode compartments from FIG. 2, a cathode compartment from FIG. 3 and four separators.
Figure 8:
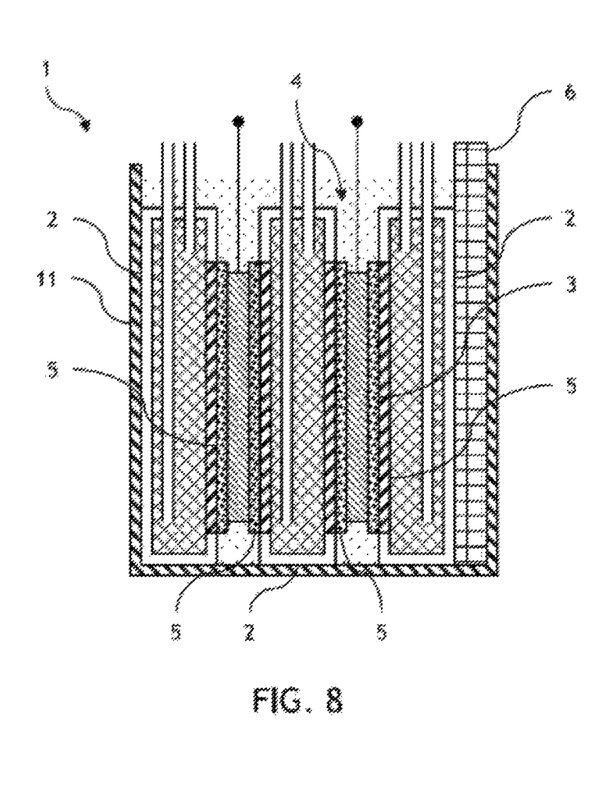
FIG. 8 shows diagrammatically an embodiment of a battery according to the present invention comprising a case, two metal electrodes, two cathode compartments from FIG. 2, a cathode compartment from FIG. 3, four separators and a compression system.
Figure 9:
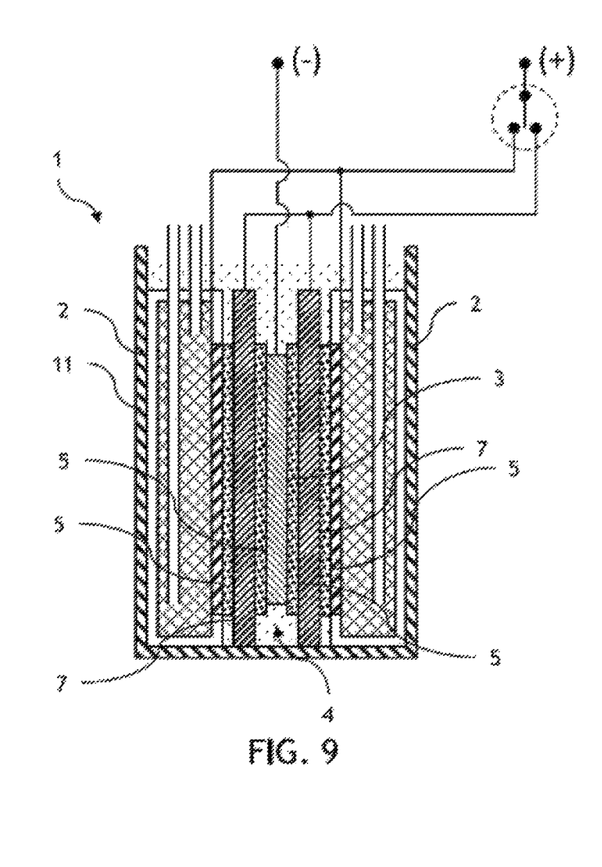
FIG. 9 shows diagrammatically an embodiment of a battery according to the present invention comprising a case, a metal electrode, two cathode compartments from FIG. 2, two second positive electrodes, and four separators.
Figure 10:
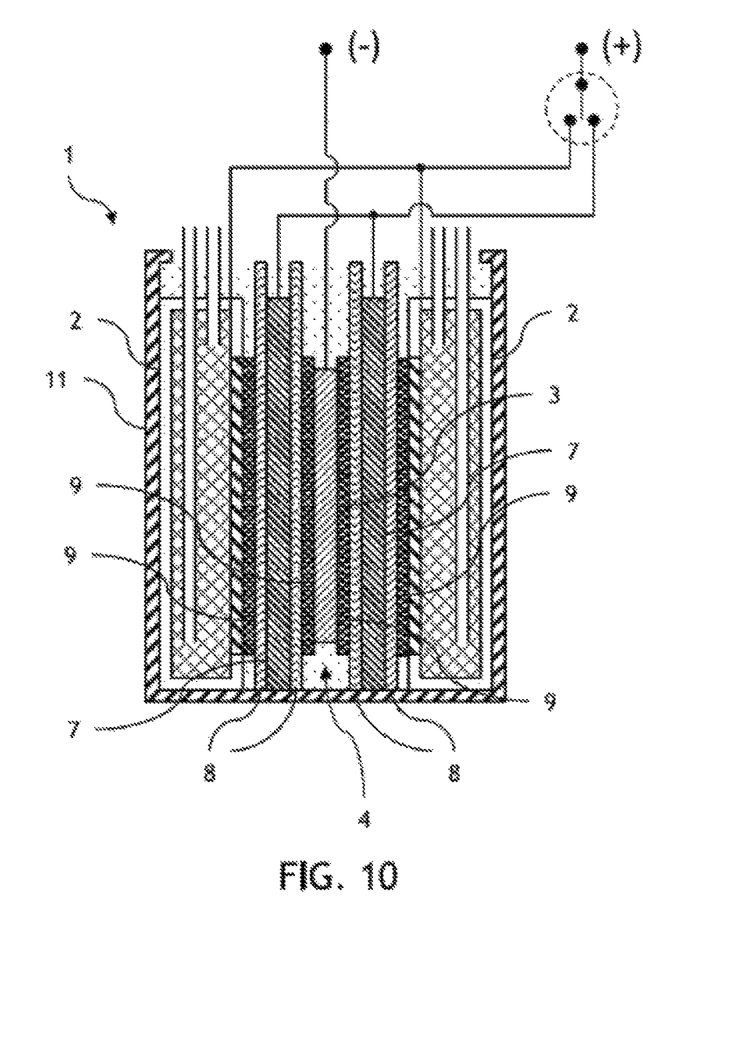
FIG. 10 represents diagrammatically an embodiment of a battery according to the present invention comprising a case, a metal electrode, two cathode compartments from FIG. 2, two second positive electrodes, four mechanical protections, and four spacers.
Figure 11:
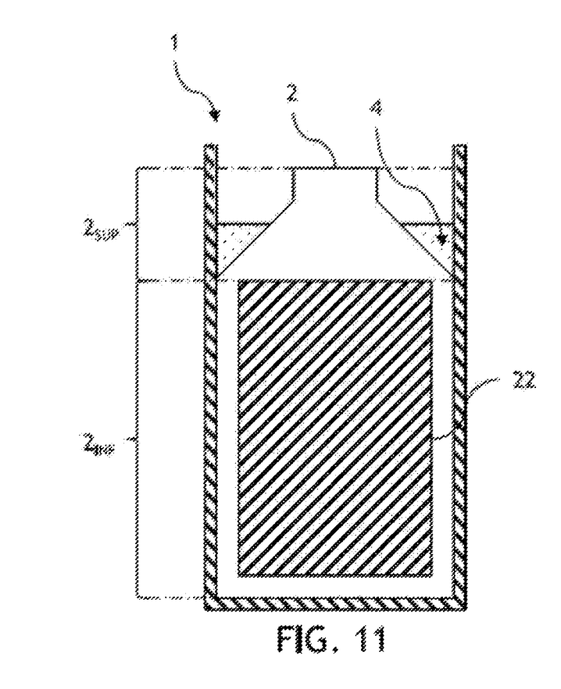
FIG. 11 shows diagrammatically a battery according to the present invention in which the cathode compartment presents an upper part and a lower part, the cross section of the upper part reducing with increasing distance from the lower part.

The battery 1 can also comprise a second positive electrode 7 for charging the battery 1 (see FIG. 9). This second positive electrode 7 is preferably arranged between the negative electrode 3 and the air electrode 2. A separator 5, for example in the form of felt that is permeable to the liquid electrolyte, can be used between the air electrode 22 and this second positive electrode 7 and/or the negative electrode 3 and the second positive electrode 7.

The second positive electrode 7 can also be attached to the cartridge 21 of the cathode compartment 2 in order to facilitate the insertion or the removal of the air electrode 22 as there is then no need to pay attention to the location of the insertion of the cathode compartment 2 with respect to the second positive electrode 7.

The second positive electrode 7 provides protection to the air electrode 22 during the charging phase of the battery 1. In fact, during the charging phase of the battery 1, the air electrode 22 is disconnected from the positive terminal and the second positive electrode 7 connected thereto. Thus, during the charging phase, the air electrode 22 is not used, and the second positive electrode 7 replaces it. It may be decided that the air electrode 22 and the second positive electrode 7 are used at the same time at the start of charging and that only the second positive electrode 7 is used when the charging voltage is greater than a given value. Further details relating to the use of a second positive electrode 7 are given for example in the document WO 2012/156639.

A spacer 8 can be placed in contact with the second positive electrode 7 in order to maintain the second positive electrode 7 at a distance from the other elements of the battery so as to facilitate the removal of the oxygen bubbles produced on the second positive electrode 7 during charging. For example, the spacer 8 is arranged between the second positive electrode 7 and the negative electrode 3 and/or between the second positive electrode 7 and the air electrode 22. This spacer 8 is permeable to the electrolyte when the latter is liquid. This spacer 8 can be, for example, a plastic grid. The compression pressure on the metal electrode can be exerted via the spacer 8. As a variant, provision can be made for two spacers 8, arranged one on either side of the positive electrode 7.

In this case, a mechanical protection 9 that is permeable to the liquid electrolyte, for example a felt, can be provided between the spacer 8 and the metal electrode 3 or the air electrode 22 in order to protect the metal electrode 3 or the air electrode 22 of the spacer.

Generally, the number of possible cathode compartments 2 and that of the metal electrodes 3 are adapted according to requirements. The only limit imposed is that each air electrode 2 is coupled to a metal electrode 3 with a separator 5 between them. Illustrative embodiments are described below and can be combined together. Although these illustrative examples refer to a metal-air battery, the following paragraphs can easily be adapted to other types of batteries comprising an air electrode.

In a first embodiment (FIG. 5) the battery 1 comprises two cathode compartments 2, each having a single air electrode 22 forming a part of a face of the cassette 21, and a mechanical reinforcement 26. The battery 1 also comprises a metal electrode 3. This metal electrode 3 is arranged between the two cathode compartments 2 so as to be compressed between them.

In a second embodiment (FIG. 6), the battery 1 is identical to the first embodiment with the exception that each of the cathode compartments 2 comprises a rim 28. These rims 28 are arranged so as to face each other.

In a third embodiment (FIG. 7) the battery 1 comprises two cathode compartments 2, each having a single air electrode 22 forming at least a part of a face of the cassette 21, and a mechanical reinforcement 26. The battery 1 also comprises a cathode compartment 2, having two air electrode 22 forming at least a part of two opposite faces of the cassette 21. The battery 1 also comprises two metal electrodes 3 and four separators 5. The cathode compartments 2, the metal electrodes 3 and the separators 5 are arranged in the following order: a first cathode compartment with a single air electrode against a first wall of the case, a first separator, a first metal electrode, a second separator, the cathode compartment with two air electrodes, a third separator, a second metal electrode, a fourth separator and finally the second cathode compartment with a single air electrode against a second wall of the case opposite the first wall.

In a fourth embodiment (FIG. 8), the battery 1 is identical to the third embodiment with the exception that it also comprises a compression system 6 arranged after the second cathode compartment 2, between the latter and the second wall of the case 11.

In a fifth embodiment (FIG. 9), the battery 1 is identical to the first embodiment with the exception that it also comprises two second positive electrodes 7. The elements of the battery are arranged inside the case so that they are in the following order: a first cathode compartment 2 with an air electrode, a first separator 5, a first second positive electrode 7, a second separator 5, the metal electrode 3, a third separator 5, a second second positive electrode 7, a fourth separator 5 and a second cathode compartment 2 with an air electrode.

In a sixth embodiment (FIG. 10) the battery 1 is similar to the fifth embodiment except for the fact that the separators have been replaced by assemblies each comprising a spacer 8 and a mechanical protection 9, the spacer 8 being arranged against a second positive electrode 7 and the mechanical protection 9 against a metal electrode 3 or an air electrode 22.

The invention claimed is:

1. A cathode compartment for an air electrode battery, comprising an air electrode,
    wherein said cathode compartment:
    is suitable to be inserted into a battery case in an extractible way,
    in which the air electrode is in the form of a plate,
    is liquid-tight,
    comprises an electrical connection for connecting said air electrode to a positive terminal of a battery,
    comprises a hollow cartridge having an air inlet and an air outlet, and
    comprises at least one flat face formed at least partially by the air electrode.

2. The cathode compartment according to claim 1, comprising a rim on its face, formed at least partially by the air electrode of the cartridge.

3. The cathode compartment according to claim 1, comprising an additional air electrode in the form of a plate at least partially forming another face of the hollow cartridge, the other face being opposite to the face formed at least partially by the air electrode.

4. The cathode compartment according to claim 1, comprising a honeycombed mechanical reinforcement arranged inside the cartridge resting against the air electrode.

5. The cathode compartment according to claim 1, wherein said cathode compartment has a lower part and an upper part, the lower part comprising the air electrodes and the upper part having at least one section perpendicular to the plane of the air electrodes below the section of the lower part.

6. A rechargeable battery comprising a case and inside said case:
    an air electrode;
    a negative electrode; and
    an electrolyte;
    wherein the air electrode is extractible from the case and incorporated into the cathode compartment according to claim 1.

7. The battery according to claim 6, wherein:
    the negative electrode is a metal electrode,
    the electrolyte is a liquid electrolyte,
    said battery comprises an electrically insulating separator between the air electrode and the metal electrode and a flexible element,
    the cathode compartment further comprises a rim on its face, formed at least partially by the air electrode of the cartridge, and is moveable within the case, and
    the separator, the cathode compartment and the metal electrode are arranged so that said flexible element acts on said cathode compartment so that said cathode compartment compresses the metal electrode via said cathode compartment face formed at least partially by the air electrode.

8. The battery according to claim 7, wherein the flexible element is formed by the case or is a compression system arranged against a wall of the case.

9. The battery according to claim 7, comprising:
    a second air electrode incorporated into a second moveable cathode compartment, said second moveable cathode compartment being extractible, and
    a second separator between the second air electrode and the metal electrode,
    wherein the two cathode compartments, the metal electrode the separators and the flexible element are arranged so that the metal electrode is compressed between the two cathode compartments via their faces formed at least partially by the air electrodes.

10. The battery according to claim 6, comprising a second positive electrode for charging the battery.

11. The battery according to claim 10, wherein:
the second positive electrode is arranged between the cathode compartment and the negative electrode, and
said battery also comprises at least one spacer placed in contact with said second positive electrode in order to facilitate the removal of oxygen bubbles produced on the second positive electrode during charging.

12. The battery according to claim 11, comprising two spacers placed one on either side of the positive electrode.

13. The battery according to claim 11 wherein:
at least one spacer is provided against a face of the second positive electrode turned towards the negative electrode, respectively towards the air electrode, and
said battery also comprises at least one mechanical protection arranged between the spacer and the negative electrode, respectively the air electrode.

* * * * *